US012003525B2

(12) United States Patent
Formicola et al.

(10) Patent No.: US 12,003,525 B2
(45) Date of Patent: Jun. 4, 2024

(54) DEVELOPMENT SECURITY OPERATIONS ON THE EDGE OF THE NETWORK

(71) Applicant: Siemens Aktiengesellschaft, Munich (DE)

(72) Inventors: Valerio Formicola, Princeton, NJ (US); Charif Mahmoudi, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 250 days.

(21) Appl. No.: 17/711,427

(22) Filed: Apr. 1, 2022

(65) Prior Publication Data
US 2022/0321594 A1    Oct. 6, 2022

Related U.S. Application Data

(60) Provisional application No. 63/169,983, filed on Apr. 2, 2021.

(51) Int. Cl.
*H04L 9/40* (2022.01)

(52) U.S. Cl.
CPC .............................. *H04L 63/1433* (2013.01)

(58) Field of Classification Search
CPC ........................... H04L 63/1433; G06F 21/577
USPC ......................................................... 706/25
See application file for complete search history.

(56) References Cited

U.S. PATENT DOCUMENTS

| | | | | |
|---|---|---|---|---|
| 6,484,292 B1* | 11/2002 | Jain | ....................... | G06F 30/327 716/107 |
| 8,484,726 B1* | 7/2013 | Sutton | ................. | H04L 63/1416 709/224 |
| 10,042,935 B1* | 8/2018 | Perkins | ................. | G06F 16/532 |
| 10,554,637 B1* | 2/2020 | Bendersky | ............. | H04L 9/085 |
| 11,134,058 B1* | 9/2021 | Sole | ....................... | H04W 12/12 |
| 11,367,116 B1* | 6/2022 | Verma | ................ | G06Q 30/0629 |
| 11,720,686 B1* | 8/2023 | Cross | .................... | G06F 21/577 726/25 |
| 2008/0189788 A1* | 8/2008 | Bahl | .................... | H04L 63/1416 726/25 |
| 2012/0011489 A1* | 1/2012 | Murthy | ................. | G06F 21/577 717/126 |
| 2013/0198713 A1* | 8/2013 | Zhang | ..................... | G06F 17/13 717/106 |
| 2014/0280268 A1* | 9/2014 | Mckay | ................ | H04L 41/0893 707/758 |
| 2015/0373546 A1* | 12/2015 | Haugen | ............... | H04L 41/0869 726/22 |
| 2016/0188882 A1* | 6/2016 | Mahrous | ................ | G06Q 50/00 726/25 |
| 2018/0032760 A1* | 2/2018 | Hu | ......................... | G06F 21/71 |
| 2019/0114435 A1* | 4/2019 | Bhalla | ..................... | G06F 21/55 |
| 2020/0081691 A1* | 3/2020 | Gupta | .................... | G06N 3/082 |
| 2020/0159525 A1* | 5/2020 | Bhalla | .................... | G06N 5/022 |
| 2020/0202006 A1* | 6/2020 | Shah | ........................ | G06F 8/77 |
| 2020/0265134 A1* | 8/2020 | Cristina | .................... | G06F 8/60 |

(Continued)

FOREIGN PATENT DOCUMENTS

| EP | 3872625 A1 * | 9/2021 | ............... | G06F 8/34 |
|---|---|---|---|---|
| EP | 4006715 A1 * | 6/2022 | ............... | G06F 8/34 |

*Primary Examiner* — Hamza N Algibhah (57) ABSTRACT

A zero trust architecture can continuously monitor and verify code uploaded at the edge of 5G networks, so as to automatically identify security inconsistencies between security requirements and the performance of a given system.

17 Claims, 4 Drawing Sheets

(56) References Cited

U.S. PATENT DOCUMENTS

| | | | | |
|---|---|---|---|---|
| 2020/0326914 A1* | 10/2020 | Koelewijn | ............... | G06F 8/36 |
| 2020/0371753 A1* | 11/2020 | Dhawal | ............... | G06F 9/44589 |
| 2020/0382529 A1* | 12/2020 | Higgins | ............. | H04L 63/1425 |
| 2020/0404014 A1* | 12/2020 | Pfleger de Aguiar | | |
| | | | | H04L 63/1408 |
| 2021/0021609 A1* | 1/2021 | Smith | ............... | H04L 63/123 |
| 2021/0112078 A1* | 4/2021 | Huston, III | ......... | H04L 63/1425 |
| 2021/0168125 A1* | 6/2021 | Vemulpali | ............ | H04L 63/0263 |
| 2021/0279338 A1* | 9/2021 | Bowman | ............... | G06F 21/577 |
| 2022/0007192 A1* | 1/2022 | Shaw | ............... | H04L 63/0209 |
| 2022/0007193 A1* | 1/2022 | Shaw | ............... | H04L 63/1433 |
| 2022/0007194 A1* | 1/2022 | Shaw | ............... | H04L 63/20 |
| 2022/0021665 A1* | 1/2022 | Barton | ............... | H04L 63/08 |
| 2022/0224709 A1* | 7/2022 | Vasudevan | ............ | G06F 21/606 |
| 2022/0366056 A1* | 11/2022 | Lee | ............... | G06F 21/563 |
| 2024/0031337 A1* | 1/2024 | Sharma | ............... | H04L 63/0281 |

\* cited by examiner

DEVELOPMENT SECURITY OPERATIONS ON THE EDGE OF THE NETWORK

BACKGROUND

Development, security, and operations is commonly referred to as DevSecOps. DevSecOps generally refers to integrating security via automation and platform design as a shared responsibility throughout an entire information technology (IT) lifecycle. Communication technologies, for instance 5G technologies, offer localized computing and networking services that are closer to the operational technology (OT) environment, for instance at the edge of 5G networks. Such services were typically only available in IT environments. While 5G and other communication technologies foster convergence of IT and OT environments, it is recognized herein that current approaches to monitoring security at the edge of 5G network lack capabilities. For example, current OT environments are often vulnerable to malicious or otherwise deficient code, in part due to the frequent nature of various code updates associated with various services.

BRIEF SUMMARY

Embodiments of the invention address and overcome one or more of the described-herein shortcomings by providing methods, systems, and apparatuses that define a zero trust architecture in operational technology (OT) environments. For example, the zero trust architecture can continuously monitor and verify code uploaded at the edge of 5G networks, so as to automatically identify security inconsistencies between security requirements and the performance of a given system.

In an example aspect, at the edge of a core network, for instance the 5G edge, an application is identified that is connected to the core network. Design attributes associated with one or more specifications of the application are extracted. Further, implementation attributes associated with a code tool of the application are extracted. The edge of the core network is monitored so as to identify monitored attributes associated with the application. In the example, the design attributes, implementation attributes, and monitored attributes are compared with one another so as determine whether there is an inconsistency between the design attributes, implementation attributes, and monitored attributes. In some cases, an inconsistency is identified between at least one of the design attributes, implementation attributes, and monitored attributes. Responsive to identifying the inconsistency, a security vulnerability associated with the application can be discovered, so as to define a discovered security vulnerability. In an example, based on the discovered security vulnerability, access of the application to the core network is limited or denied. Further, based on the discovered security vulnerability, an administrator of the core network of the discovered security vulnerability can be alerted.

In an example, a code update associated with the application is identified. Extracting the implementation attributes can be responsive to identifying the code update. In some cases, monitoring the edge of the core network further comprises monitoring the edge by a run-time execution environment that mirrors a software execution environment of the edge. Further, in an example, a model is generated based on the monitoring of the edge of the core network, and inconsistencies are identified using the model.

BRIEF DESCRIPTION OF THE SEVERAL VIEWS OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

As an initial matter, microservices refer to the de-facto technology adopted to implement and deploy new services in 5G for communications and network customers. As used herein, microservices and applications can be used interchangeably without limitation, unless otherwise specified. Similarly, examples are often described herein in the context of 5G networks, though it will be understood embodiments are not limited to specific 5G networks or 5G nodes. It is recognized herein that such microservices are often associated with frequent code updates. It is further recognized herein that development operations (DevOps) strategies can be implemented so as to integrate code, deliver code, test code, and provide feedback to developers in an expedited manner, but, in some cases, code is continuously produced such that vulnerabilities in a given operational environment can be introduced at any time, via purposely malicious code or negligently generated code, for example. To address these vulnerabilities, among other issues, embodiments described herein automatically monitor security aspects of a given system, such as code updates and system performance properties, to identify inconsistencies or vulnerabilities.

It is also recognized herein that most security tools in a development lifecycle are executed manually with code analysis software packages or with risk assessment tools. For example, current tools might exist for static code analysis, or for application profiling and security analysis of applications, but such tools are typically instructed by rules created manually by human threat intelligence teams or security analysts.

Figure 1:
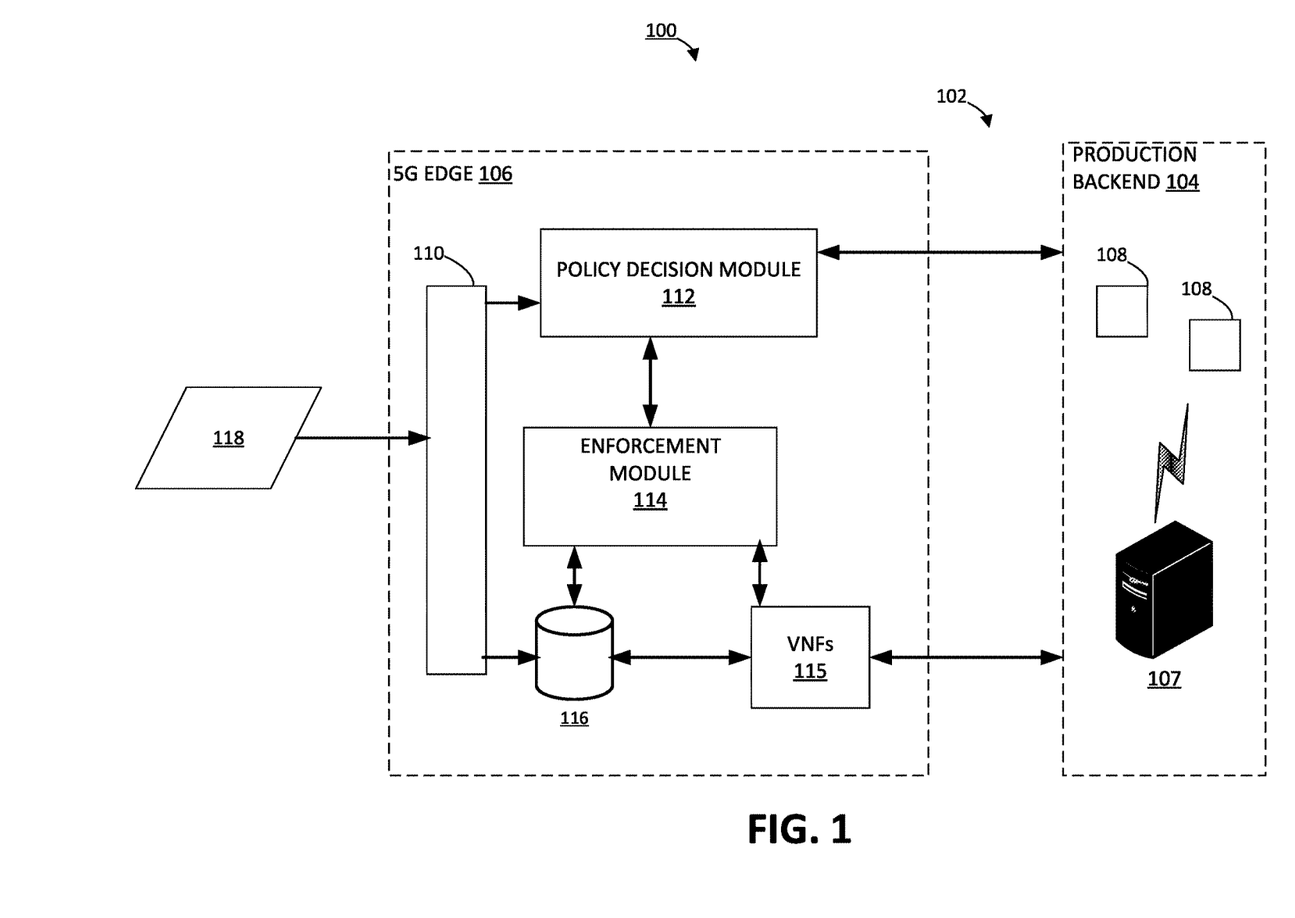
FIG. 1 is a block diagram of an example communications system defining a production backend and a 5G edge that defines a zero trust architecture for various microservices and applications, in accordance with an example embodiment.

Referring to FIG. 1, an example communication system 100 includes a communication network 102 that can define a production backend 104 a core network (e.g., 5G core) communicatively coupled to the production backend 104. In particular, the core network can define an edge, for instance a 5G edge 106, that is communicatively coupled to the production backend 104. The production backend 104 can define an operational environment that can include a plurality of computing devices, for instance servers and controllers 107 and user equipment (UEs) 108 communicatively coupled to the servers and controllers 107. In some cases, the UEs 108 can define various computing devices involved in industrial automation, for instance robots, sensors, robotic arms, industrial controllers, or the like. The communication system, in particular the 5G edge 106, can include one or more processors and memory having stored thereon applications, agents, and computer program modules including, for example, an extraction module 110, a zero trust policy decision module 112 communicatively coupled to the extraction module 110, and zero trust enforcement module 114 communicatively coupled to the zero trust policy decision module 112. The 5G edge 106 can further define various network function virtualizations (NFVs) 115 and databases 116 configured to maintain catalogs of applications and microservices, for example.

It will be appreciated that the program modules, applications, computer-executable instructions, code, or the like depicted in FIG. 1 are merely illustrative and not exhaustive, and that processing described as being supported by any particular module may alternatively be distributed across multiple modules or performed by a different module. In addition, various program module(s), script(s), plug-in(s), Application Programming Interface(s) (API(s)), or any other suitable computer-executable code may be provided to support functionality provided by the program modules, applications, or computer-executable code depicted in FIG. 1 and/or additional or alternate functionality. Further, functionality may be modularized differently such that processing described as being supported collectively by the collection of program modules depicted in FIG. 1 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 1 may be implemented, at least partially, in hardware and/or firmware across any number of devices.

The 5G edge 106 can perform controls on network communications due to the flexibility of virtualization technologies. In particular, in some examples, the NFVs 115 can monitor the security of individual applications, for instance microservices or applications 118, that are uploaded at the 5G edge 106, thereby defining a zero trust architecture. As further described herein, the system 100, in particular the 5G edge 106, can automatically assess the security of applications 118 at runtime of the applications 118. In particular, the specifications associated with each microservice or application 118 can be evaluated, and each microservice or application 118 can be monitored by the 5G edge 106, so as to allow continuous verification with security management nodes at the production backend 104. By way of example, a given application 118 can define code, for instance Mendix low-code, which is uploaded to a given virtualization environment hosted in the 5G edge 106. It will be understood that the code defined by the applications 118 can be generated in various development platforms and take various forms, and all such code is contemplated as being within the scope of this disclosure. By way of example, applications 118 can be associated with different types of information, such as Polarion Application Lifecycle Management (ALM) information, that is implemented in various code (e.g., Mendix).

The system 100 includes the extraction module 110 that can extract various design attributes associated with the applications 118. In some cases, the extraction module 110 defines one or more natural language processors. For example, code associated with the applications 118 can be automatically profiled by extracting the attributes from various code development descriptions or specifications, thereby reducing or eliminating the effort for a human in the loop to specify code behavior. In particular, for example, design attributes associated with one or more specifications of a given application 118 can be extracted from ALM information. Additionally, or alternatively, the extraction module 110 can extract various implementation attributes from the system implementation (e.g., Mendix), which can include code or low code tools, associated with a given application. Thus, implementation attributes associated with a code tool of a given application can be extracted. By way of example and without limitation, the code extraction module 110 can extract various attributes of a given application, such as: code specifications (e.g., IDs, versions, signatures, hashes, etc.); behavioral specifications (e.g., communication patterns, protocols used, ports used, etc.); security and resiliency attributes (e.g., remote user access, authentication mechanisms, logging abilities, testing, self-checking, rejuvenation, etc.); data and payload attributes (e.g., data categorization, metadata, etc.); and resource request specifications (e.g., resource, action, context, etc.). In various examples, the extraction module 110 ingests descriptions in semi-structured and structured format (e.g., SDL, UML), code snippets, templates, Natural Language descriptions of code functionalities, and the like.

In some examples, the extraction of attributes and features is trigged by the continuous deployment of code on the 5G edge 106. For example, the extraction module 110 can extract attributes responsive to the 5G edge determining that an application is attempting to connect to the core network. In particular, for example, attributes can be extracted when new code is pushed from the code development environment (e.g., microservices 118) to the 5G edge 106. Alternatively, or additionally, attributes can be extracted when the code is pulled at the 5G edge 106 from the software supplier (e.g., microservices 118). The extractions can be based on mechanisms that depend on the specific attribute being extracted. By way of example, when Mendix low-code no-code is developed in the development environment, it can be specified which connection will be requested by the associated application to pull information from a database. In various examples, additional mechanisms for various code tools can be implemented with properties from the code and tools. For example, the checksum of given code is an example attribute for software that can used to verify the integrity of an application, and which can be generated with many tools. The extraction module 110 can also include natural language processors that can operate on source code so as to parse tokens and extract behaviors of the given application. Further, the extraction module 110 can define static code analysis tools that can extract security properties and verify the existence of code patterns inside a code. The extraction module 110 can also define one or more unified modeling language (UML) tools can generate a UML diagram, for instance a class diagram, out of a source code, so as to identify links between software modules and different levels of dependencies.

In some cases, security communication patterns can be profiled at run-time for various microservices 118 deployed at the 5G edge 106, so as to generate profiles associated with various applications or microservices 118. Such profiles can be stored in the databases 116 so as to define application catalogs. The communication patterns in the application catalog can include protocol specifications, connection ports, addresses, or the like. The communication patterns can also include lists of external servers to connect to, from threads activated in the microservices 118, and the type of service nodes in the target OT and IoT deployment (e.g., production backend 104.)

As further described herein, the policy decision module 112 can perform access control of resources in the production backend 104 based on, for example, communication context and attributes associated with the applications 118. In some cases, the policy decision module 112 models operational context from microservices code analysis and project description tasks. In various examples, the policy decision module can also obtain and verify threat intelligence inputs, risk assessment models, and organization compliance statuses when a given microservice 118 is delivered and integrated in the target infrastructure.

In some examples, when a given microservice 118 is deployed on the edge networks, for instance the 5G edge 106, the code of given microservice 118 can be updated to establish communication with the production backend 104 for various purposes. It is recognized here that such communication can introduce potential new attack vectors in the target infrastructure (production backend 104). Thus, in various examples, immediate feedback is provided to the developers based on the decisions made by the policy decision module. The feedback can be provided by the policy decision module 112. For example, the policy decision module 112 can make a determination as to whether particular code is trusted, and the feedback can be provided after that determination is made. In an example, the feedback contains information concerning acceptance or rejection of code. Alternatively, or additionally, the feedback include information related to a specific inconsistency in the code that is identified.

Still referring to FIG. 1, the system 100 includes the policy enforcement module 114 that can define one or more NFVs 115 configured to monitor network communications, for instance at the 5G edge 106. Based on network communications, a model can be generated for security specifications of microservices and code updates. In some examples, the model is in a valid format for driving the decisions for each resource access. In particular, the decision module 112 can define a mathematical model for assessing a trust level for each entity requesting access to another resource. In some cases, the decision module 112 uses a scoring system to determine levels of trust associated with each access pattern and communication exchange. The scoring system can be associated to a consistency map, for instance a data model 300 (see FIG. 3). The consistency map can define a tree having nodes, wherein each node of the tree is associated to an attribute or feature type (e.g., port number, version number), and each field type has a respective relevance for cyber security decisions. In order to account for such different weights, each node can contributes in a different way to the maximum score (e.g., one), which is obtained by adding all matching nodes among the different views. In an example, if a node is not matching, there can be a penalty to reach one that can depend on the node type. In some cases, the penalty for inconsistency on a specific node is decided by the security analyst controlling the policy decision maker.

Figure 2:
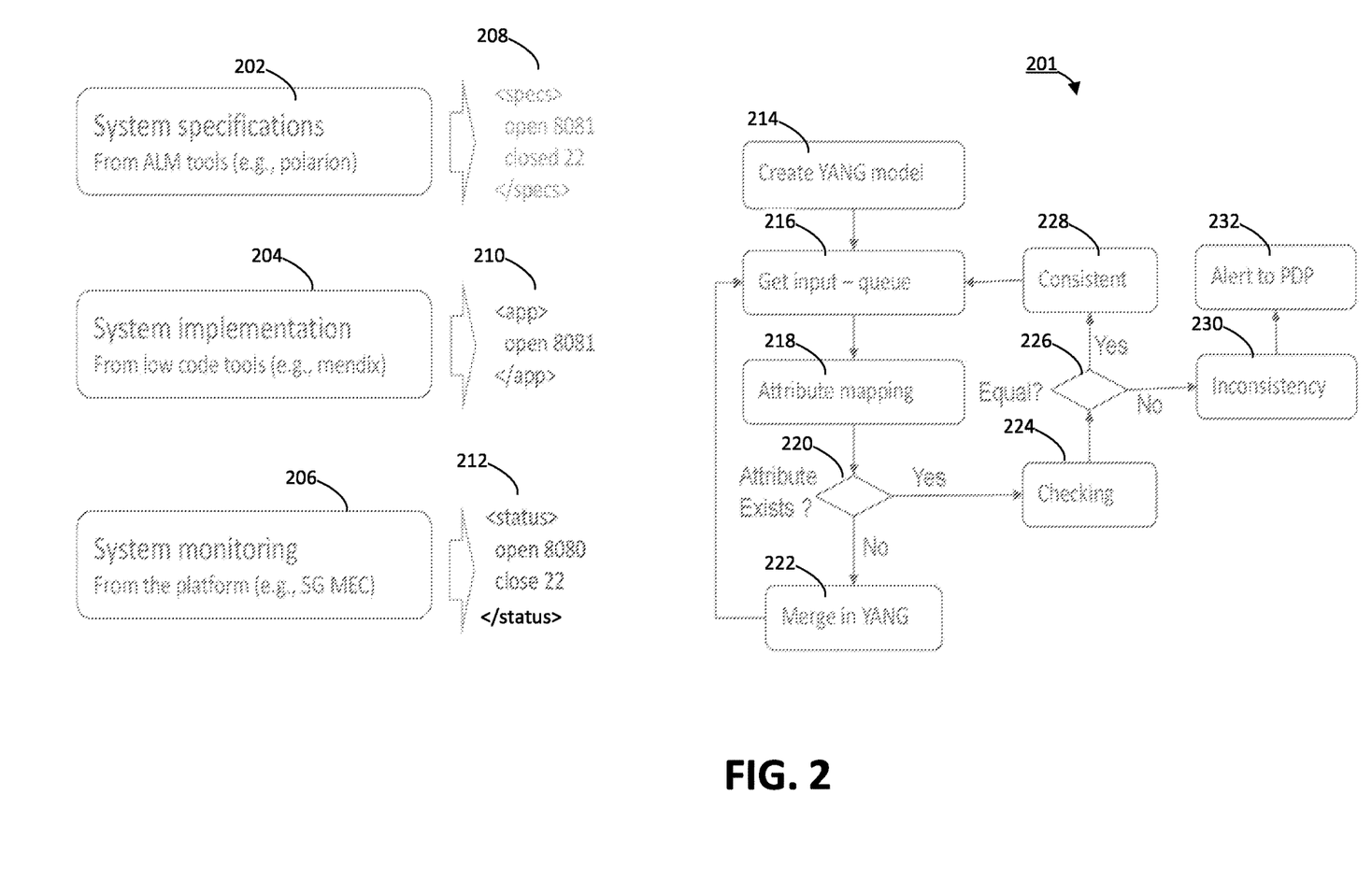
FIG. 2 illustrates example input information and a flow diagram for determining, based on the example input information, whether there are security vulnerabilities in accordance with an example embodiment.
Figure 3:
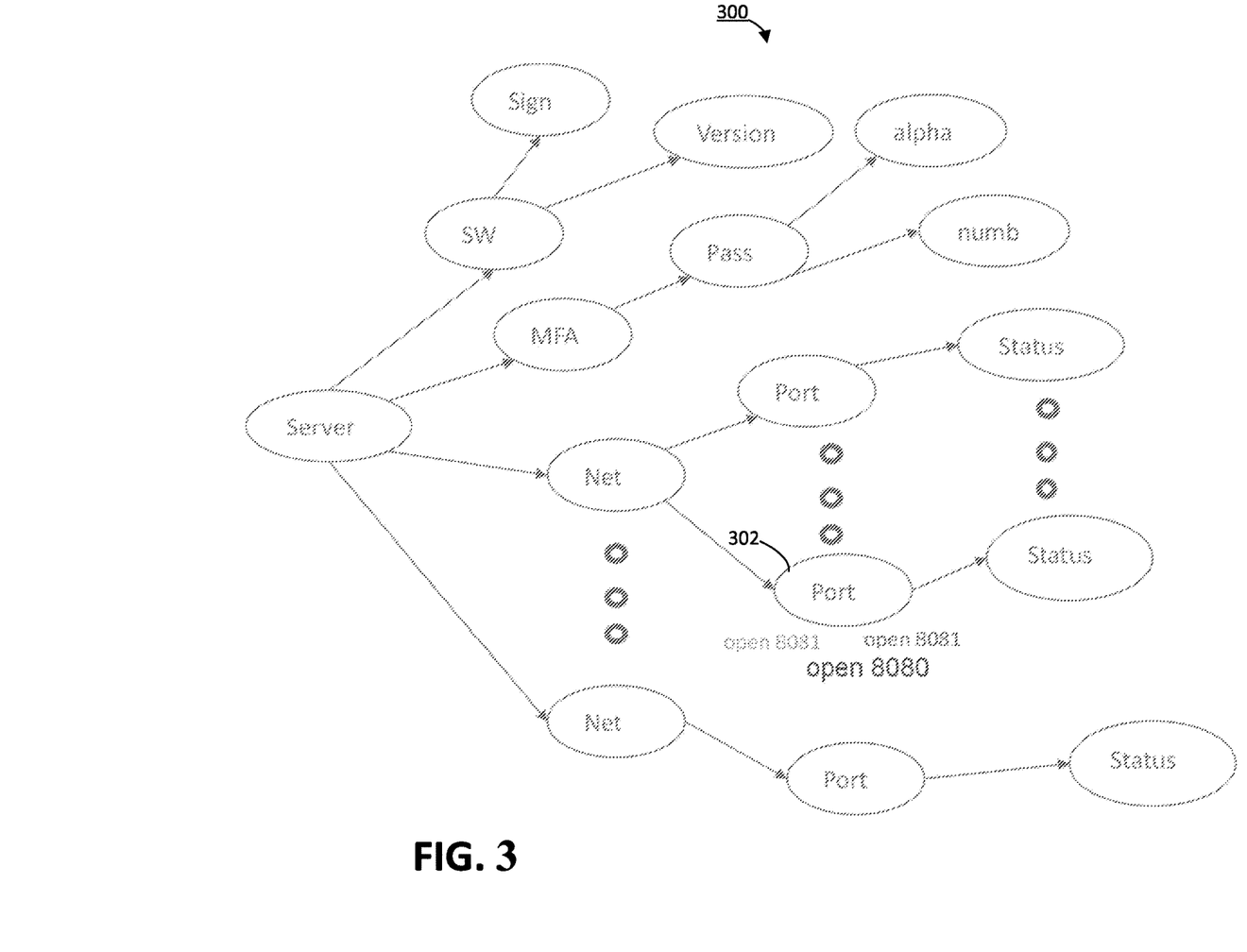
FIG. 3 illustrates an example model that can be generated and used to identify system inconsistencies, in accordance with an example embodiment.

Referring also to FIGS. 2 and 3, an example is illustrated in which the system 100, in particular the decision module 112, verifies whether various inputs associated with a given application 118 are consistent with one another. In particular, the decision module 112 can determine whether there is consistency between system specifications 202 (e.g., from ALM tools such as Polarion) associated with the application 118, system implementation information 204 (e.g., from low code tools such as Mendix), and system monitoring information 206 (e.g., from the platform such as 5G multi-access edge computing (MEC)). In an example, the system specifications 202 can represent what is claimed or specified by the software designers of the given application 118. The system implementation information 204 can represent what is expected and verified by the developer that created in the given application in the software development environment (e.g., low-code no-code tool). For example, such a developer can have knowledge about the functionalities they are implementing in the software. Further, the developer can provide a local verification of the application functionalities through an execution in their run-time environment. The local testbed for run-time environment can be different from the one at the 5G edge 106. For example, the respective testbeds can be maintained by two different entities, for instance the developer and the application user.

The monitoring information 206 can represent the actual behavior of the application 118. In particular, the monitoring information 206 can include the software attributes and features that are observed, for instance by the NFVs 115, during execution of the software at the 5G edge 106. The information sources 202, 204, and 206 can render information in a non-exclusive fashion, such that the attributes can be extracted from them independently so as to be compared with one another for consistency.

Based on the above-described sources of information that are independent of each other, the system 100 can define a zero trust architecture. In particular, the policy decision module 112 can define one or more data models, for example a data model 300, configured to model the monitoring information 206 that is obtained from a monitoring component at the 5G edge 106. The monitoring component can define a run-time execution environment at the 5G edge 106 that is equipped to trace the information specified in the consistency verification semantics. In some cases, the monitoring component has a run-time execution environment that is as close as possible to the 5G Edge software execution environment, for example using the same shared libraries, operating system, hardware and processing resources. Thus, the run-time execution environment can mirror the 5G edge software execution environment. Further, the monitoring environment can be equipped with the probes that are able to extract the information in the model 300 during the execution of the microservice. In an example, the monitoring component is supervised by the security administrator of the 5G edge 106 as a pre-production environment, and can be implemented with a sandbox whose operations are supervised for enhanced security reasons during the pre-production testing.

In some examples, the policy decision module 112 generates a model in accordance with the yet another next generation (YANG) data modeling language maintained by the IETF, though it will be understood that the policy decision module 112 can generate models in alternative data modeling languages, and all such data modeling languages are contemplated as being within the scope of this disclosure. For example, the policy decision module 112 can generate and use the model 300 to map different inputs (e.g., system specifications 202, system implementation information 204, monitoring information 206) so as to check consistency between the inputs.

Still referring to FIGS. 1-3, by way of example, and without limitation, the extraction module 110 can extract port information 208 from the system specifications 202. In particular, the portion information 208 can indicate that port 8081 is open and port 22 is closed. Similarly, the extraction module 110 can extract port information 210 from the system implementation information 204. The port information 210 can indicate that port 8081 is open. Further still, the monitoring information 208 can include port information 212 that indicates that port 8080 is open, and port 22 is closed. It will be understood that port information is illustrated for purposes of an example, and various additional or alternative information can define inputs to the policy decision module 112, and all such inputs are contemplated as being within the scope of this disclosure.

Referring in particular to FIG. 2, an example flow diagram 201 illustrates operations that can be performed by the system 100, in particular the 5G edge 106. At 214, the policy decision module 112 generates or creates a model, for instance the model 300. The model 300 can be used to define and instruct the extraction module 110 about which attributes or features are required to perform a compliance check for consistency. For instance, the attributes that are identified or extracted can be used to compose the nodes of the tree (e.g., model 300) of the policy decision module 112. The model 300 can also provide the weights to assess the compliance of each software feature, based on the scoring mechanism of the policy decision module 112.

At 216, the policy decision module 112 receives inputs associated with a given application 118, for instance the port information 208, 210, and 212. At 218, the policy decision module 112 identifies the attribute in the port information 208, 210, and 212. In particular, the port information can used to fill the tree (e.g., model 300) for comparisons. Each node of the tree can be associated with a weight than can be used to score the consistency of the software among multiple descriptions. At 220, using the model 300, the policy decision module 112 can determine whether the attribute (e.g., port) exists in the model 300. If the attribute does not exist, at 222, the policy decision module 112 can add the attribute to the model 300, and then return to step 216 where another input is evaluated.

At 224, if the policy decision module 112 determines that the attribute exists, for instance at 302, the equivalence of the same attribute or feature between different inputs can be checked. At 226, the policy decision module 112 determines whether the attribute information, for instance the portion information 208, 210, and 212, is consistent or the same as each other. In an example, at 228, the policy decision module 112 verifies that each source of information is consistent with one another, so the process then returns to step 216 where another input is evaluated for consistency. At 230, the policy decision module 112 identifies an inconsistency between the portion information 208, 210, and 212. In particular, for example, the policy decision module 112 can identify that monitoring information 206 indicates that a port is open that is different than the open port indicated by the system specifications 202 and system implementation information 204. Based on the identified inconsistency, the policy decision module 112 can determine an action, and can send an alert to the policy enforcement module 114 to take the action, at 232. Example actions include, without limitation, shutting down the associated application 118, limiting access of the associated application 118, or storing the inconsistency in the application catalog 116 for future reference.

Thus, as described herein, the system 100 can rely on multiple information sources to characterize the same manufactured software, using multiple attributes monitored or observed in different production and execution environments. Because the environments can be managed by different actors (e.g., ALM design managers or advertisers, code developers, admins of the operational environment), it is more difficult for a malicious actor to tamper with the different software features and attributes at the same time. When at least one of the three example information sources has been tampered with, the policy decision module 112 can identify the inconsistency between the information sources that is caused by the tampering, and make a determination as to how to proceed. is communicated to the Policy Decision Point as an input to decide.

To further illustrate, example use cases are now considered, though it will be understood that embodiments described herein are not limited to the example use cases. In an example, a software design description is maliciously altered by hackers to influence the decision of 5G Edge 106 administrators to trust the new/updated features produced by the software developers. The updated version specifications advertised for the software might inform the 5G vendor of a vulnerability patch, which in practice contains old or add new vulnerabilities. In this way, the 5G admin might be deceived by considering that a safer version is available, although in reality the system is being exposed to threats. In accordance with the example, because the respective views from the execution environment and from the code development do not show similar attributes, the 5G Edge admin can be informed about the inconsistency.

In another example, a malicious actor takes over the ALM and the developer environments and produces software design specifications and software codes, which are maliciously and consistently aligned with each other. However, the 5G admin observes that the execution environment is showing a different behavior for the application and, since the first two are not consistent with the third software specifications, the 5G edge admin is advised not to trust the new software delivered on the 5G edge 106.

In yet another example, the development environment is compromised and it shows inconsistency with the specification advertised by the ALM (not compromised by the hacker). The 5G Edge admin can be advised to not trust the software.

In yet other example, the run-time environment of the 5G Edge 106 is compromised, for example, because of the installation of a malicious shared library or interpreter in the 5G environment. The ALM specification and the code attributes are different from what is observed in the runtime environment and the 5G admin can be alerted of this inconsistency in his/her environment by the policy decision module 112.

Figure 4:
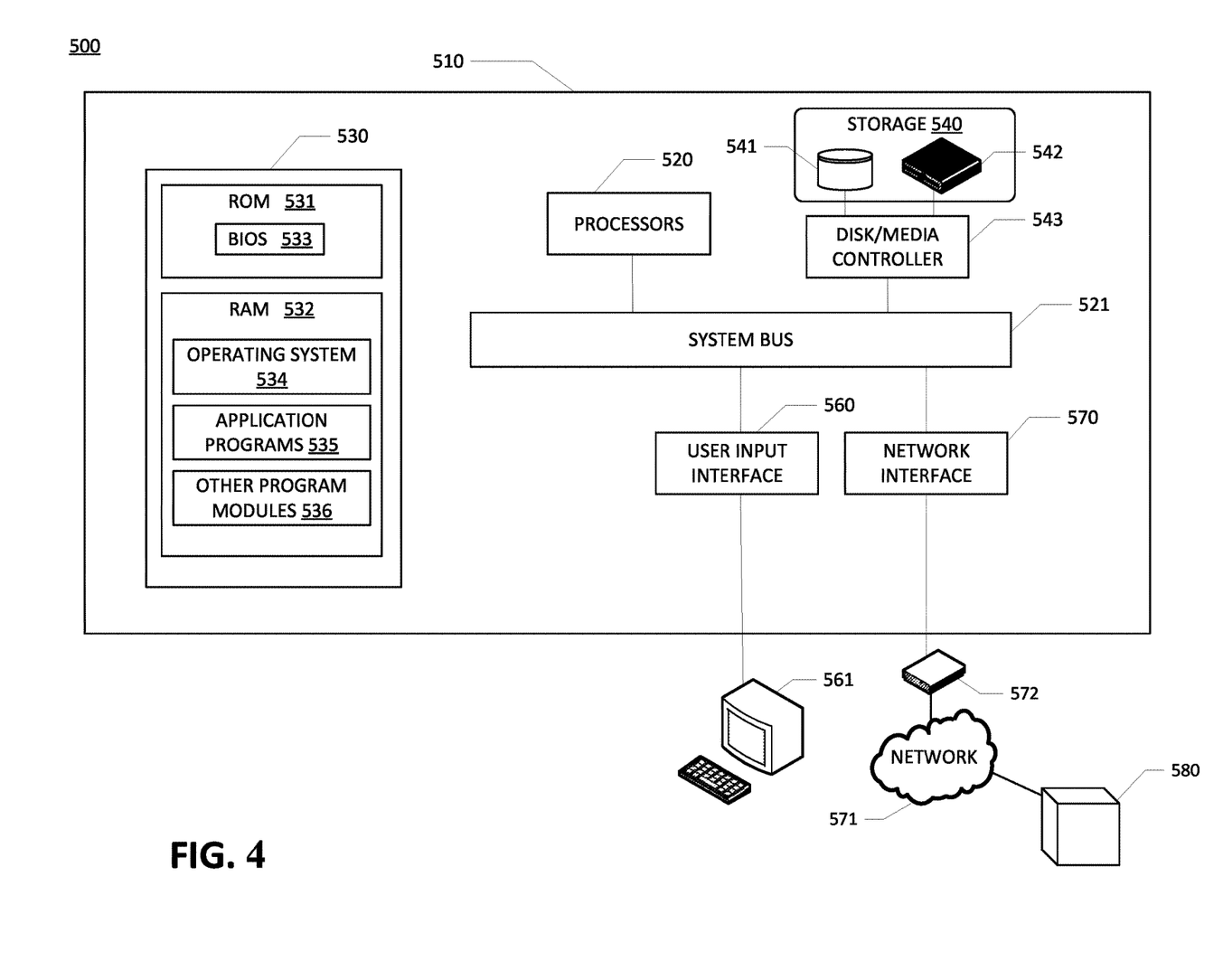
FIG. 4 illustrates a computing environment within which embodiments of the disclosure may be implemented.

FIG. 4 illustrates an example of a computing environment within which embodiments of the present disclosure may be implemented. A computing environment 500 includes a computer system 510 that may include a communication mechanism such as a system bus 521 or other communication mechanism for communicating information within the computer system 510. The computer system 510 further includes one or more processors 520 coupled with the system bus 521 for processing the information. The communication system 100 may include, or be coupled to, the one or more processors 520.

The processors 520 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 520 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 521 may include at least one of a system bus, a memory bus, an address bus, or a message bus, and may permit exchange of information (e.g., data (including computer-executable code), signaling, etc.) between various components of the computer system 510. The system bus 521 may include, without limitation, a memory bus or a memory controller, a peripheral bus, an accelerated graphics port, and so forth. The system bus 521 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 4, the computer system 510 may also include a system memory 530 coupled to the system bus 521 for storing information and instructions to be executed by processors 520. The system memory 530 may include computer readable storage media in the form of volatile and/or nonvolatile memory, such as read only memory (ROM) 531 and/or random access memory (RAM) 532. The RAM 532 may include other dynamic storage device(s) (e.g., dynamic RAM, static RAM, and synchronous DRAM). The ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in the ROM 531. RAM 532 may contain data and/or program modules that are immediately accessible to and/or presently being operated on by the processors 520. System memory 530 may additionally include, for example, operating system 534, application programs 535, and other program modules 536. Application programs 535 may also include a user portal for development of the application program, allowing input parameters to be entered and modified as necessary.

The operating system 534 may be loaded into the memory 530 and may provide an interface between other application software executing on the computer system 510 and hardware resources of the computer system 510. More specifically, the operating system 534 may include a set of computer-executable instructions for managing hardware resources of the computer system 510 and for providing common services to other application programs (e.g., managing memory allocation among various application programs). In certain example embodiments, the operating system 534 may control execution of one or more of the program modules depicted as being stored in the data storage 540. The operating system 534 may include any operating system now known or which may be developed in the future including, but not limited to, any server operating system, any mainframe operating system, or any other proprietary or non-proprietary operating system.

The computer system 510 may also include a disk/media controller 543 coupled to the system bus 521 to control one or more storage devices for storing information and instructions, such as a magnetic hard disk 541 and/or a removable media drive 542 (e.g., floppy disk drive, compact disc drive, tape drive, flash drive, and/or solid state drive). Storage devices 540 may be added to the computer system 510 using an appropriate device interface (e.g., a small computer system interface (SCSI), integrated device electronics (IDE), Universal Serial Bus (USB), or FireWire). Storage devices 541, 542 may be external to the computer system 510.

The computer system 510 may also include a field device interface 565 coupled to the system bus 521 to control a field device 566, such as a device used in a production line. The computer system 510 may include a user input interface or GUI 561, which may comprise one or more input devices, such as a keyboard, touchscreen, tablet and/or a pointing device, for interacting with a computer user and providing information to the processors 520.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium of storage 540, such as the magnetic hard disk 541 or the removable media drive 542. The magnetic hard disk 541 (or solid state drive) and/or removable media drive 542 may contain one or more data stores and data files used by embodiments of the present disclosure. The data store 540 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure.

It will be understood that each block of the flowchart illustrations and/or block diagrams, and combinations of blocks in the flowchart illustrations and/or block diagrams, may be implemented by computer readable medium instructions.

The computing environment 300 may further include the computer system 510 operating in a networked environment using logical connections to one or more remote computers, such as remote computing device 580. The network interface 570 may enable communication, for example, with other remote devices 580 or systems and/or the storage devices 541, 542 via the network 571. Remote computing device 580 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing device 580). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

It should be appreciated that the program modules, applications, computer-executable instructions, code, or the like depicted in FIG. 4 as being stored in the system memory 530 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 510, the remote device 580, and/or hosted on other computing device(s) accessible via one or more of the network(s) 571, may be provided to support functionality provided by the program modules, applications, or computer-executable code depicted in FIG. 4 and/or additional or alternate functionality. Further, functionality may be modularized differently such that processing described as being supported collectively by the collection of program modules depicted in FIG. 4 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 4 may be implemented, at least partially, in hardware and/or firmware across any number of devices.

It should further be appreciated that the computer system 510 may include alternate and/or additional hardware, software, or firmware components beyond those described or depicted without departing from the scope of the disclosure. More particularly, it should be appreciated that software, firmware, or hardware components depicted as forming part of the computer system 510 are merely illustrative and that some components may not be present or additional components may be provided in various embodiments. While various illustrative program modules have been depicted and described as software modules stored in system memory 530, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method performed at an edge of a core network, the method comprising:
    identifying an application that is connected to the core network;
    extracting design attributes associated with one or more specifications of the application;
    extracting implementation attributes associated with a code tool of the application;
    monitoring the edge of the core network so as to identify monitored attributes associated with the application; and
    comparing the design attributes, implementation attributes, and monitored attributes with one another so as determine whether there is an inconsistency between the design attributes, implementation attributes, and monitored attributes.

2. The method as recited in claim 1, the method further comprising:
    identifying the inconsistency between at least one of the design attributes, implementation attributes, and monitored attributes; and
    responsive to identifying the inconsistency, discovering a security vulnerability associated with the application, so as to define a discovered security vulnerability.

3. The method as recited in claim 2, the method further comprising:
    based on the discovered security vulnerability, limiting access of the application to the core network.

4. The method as recited in claim 2, the method further comprising:
    based on the discovered security vulnerability, alerting an administrator of the core network of the discovered security vulnerability.

5. The method as recited in claim 1, the method further comprising:
    identifying a code update associated with the application, wherein extracting the implementation attributes is responsive to identifying the code update.

6. The method as recited in claim 1, wherein the monitoring the edge of the core network further comprises monitoring the edge by a run-time execution environment that mirrors a software execution environment of the edge.

7. The method as recited in claim 1, wherein the design attributes, implementation attributes, and monitored attributes define respective port information associated with the application.

8. The method as recited in claim 1, the method further comprising:
   generating a model based on the monitoring of the edge of the core network; and
   identifying the inconsistency using the model.

9. A module within a core network, the module comprising:
   a processor; and
   a memory storing instructions that, when executed by the processor, configure the module to:
      identify an application that is connected to the core network;
      extract design attributes associated with one or more specifications of the application;
      extract implementation attributes associated with a code tool of the application;
      monitor an edge of the core network so as to identify monitored attributes associated with the application; and
      compare the design attributes, implementation attributes, and monitored attributes with one another so as determine whether there is an inconsistency between the design attributes, implementation attributes, and monitored attributes.

10. The module as recited in claim 9, the memory further storing instructions that, when executed by the processor, further configure the module to:
   identify the inconsistency between at least one of the design attributes, implementation attributes, and monitored attributes; and
   responsive to identifying the inconsistency, discover a security vulnerability associated with the application, so as to define a discovered security vulnerability.

11. The module as recited in claim 10, the memory further storing instructions that, when executed by the processor, further configure the module to:
   based on the discovered security vulnerability, limit access of the application to the core network.

12. The module as recited in claim 10, the memory further storing instructions that, when executed by the processor, further configure the module to:
   based on the discovered security vulnerability, alerting an administrator of the core network of the discovered security vulnerability.

13. The module as recited in claim 9, the memory further storing instructions that, when executed by the processor, further configure the module to:
   identify a code update associated with the application, wherein extracting the implementation attributes is responsive to identifying the code update.

14. The module as recited in claim 9, the memory further storing instructions that, when executed by the processor, further configure the module to:
   monitor the edge by a run-time execution environment that mirrors a software execution environment of the edge.

15. The module as recited in claim 9, wherein the design attributes, implementation attributes, and monitored attributes define respective port information associated with the application.

16. The module as recited in claim 9, the memory further storing instructions that, when executed by the processor, further configure the module to:
   generate a model based on the monitoring of the edge of the core network; and
   identify the inconsistency using the model.

17. A non-transitory computer-readable storage medium including instructions that, when processed by a computing system cause the computing system to perform operations comprising:
   identifying an application that is connected to a core network;
   extracting design attributes associated with one or more specifications of the application;
   extracting implementation attributes associated with a code tool of the application;
   monitoring an edge of the core network so as to identify monitored attributes associated with the application; and
   comparing the design attributes, implementation attributes, and monitored attributes with one another so as determine whether there is an inconsistency between the design attributes, implementation attributes, and monitored attributes.

\* \* \* \* \*